United States Patent [19]
Bothell et al.

[11] Patent Number: 5,836,623
[45] Date of Patent: Nov. 17, 1998

[54] CONNECTOR SYSTEM FOR USE IN ULTRA-HIGH VACUUM SYSTEMS

[76] Inventors: Richard D. Bothell; Jed Bothell, both of 2760 Washington St., Port Townsend, Wash. 98368

[21] Appl. No.: 717,132

[22] Filed: Sep. 20, 1996

[51] Int. Cl.$^6$ .................................................. F16L 55/00
[52] U.S. Cl. ............................ 285/148.9; 285/148.12; 285/328; 285/363; 285/422
[58] Field of Search ........................... 285/148.7, 148.9, 285/148.11, 148.12, 422, 328, 363

[56] References Cited

U.S. PATENT DOCUMENTS

| | | | |
|---|---|---|---|
| 2,137,097 | 11/1938 | Sateren | 285/148.12 |
| 2,823,933 | 2/1958 | Hickman et al. | 285/148.12 |
| 3,119,632 | 1/1964 | Skinner | 285/422 X |
| 3,311,392 | 3/1967 | Buschow | 285/148.12 |
| 3,425,718 | 2/1969 | Shaw | 285/148.12 |
| 3,521,910 | 7/1970 | Callahan et al. | 285/422 X |
| 3,584,903 | 6/1971 | Pritchard | 285/422 X |
| 3,876,136 | 4/1975 | Bomberger | 285/148.12 |
| 4,702,406 | 10/1987 | Sullivan et al. | 285/148.11 X |
| 4,988,130 | 1/1991 | Obara et al. | 285/328 |

OTHER PUBLICATIONS

Brochure by Atlas Technologies, 2760 Washington Street, Port Townsend, WA 98368, entitled "Atlas Technologies ConPlex, UHV Transition Flanges".

Brochure by Atlas Technologies, 2760 Washington Street, Port Townsend, WA 98368, entitled "Atlas Technologies DiaPlex, Co–Axial All Metal Transition Feedthroughs for Standard Tubing and Pipe".

Brochure by Atlas Technologies, 2760 Washington Street, Port Townsend, WA 98368, entitled "Atlas Technologies OrthoPlex, All Metal Transition Feedthroughs for Standard Tubing and Pipe".

*Primary Examiner*—Dave W. Arola
*Attorney, Agent, or Firm*—Seed and Berry LLP

[57] ABSTRACT

A connector for use in an ultra-high vacuum system that has a metal conduit section with a first hardness, a metal fitting member with a second hardness greater than the first hardness of the conduit section, and a metallic reaction-inhibiting barrier positioned between the conduit section and the fitting member to sealingly attach the conduit section and fitting member together. The metal conduit section has a first end, a second end, and a flow path between the first and second ends. The metal fitting member has a rear face proximate to the second end of the conduit section, a front face facing away from the rear face, and an opening between the front and rear faces aligned with the flow path of the conduit section. The reaction-inhibiting member also has an aperture aligned with the flow path of the conduit section and the opening of the fitting member. The reaction-inhibiting member is selected from a group of metals that will substantially inhibit metallic and chemical interaction between the conduit section and the fitting member. Accordingly, the reaction-inhibiting barrier prevents the joint between the metal conduit section and the metal fitting member from deteriorating and causing leaks under ultra-high vacuum and temperature cycling conditions.

11 Claims, 3 Drawing Sheets

CONNECTOR SYSTEM FOR USE IN ULTRA-HIGH VACUUM SYSTEMS

TECHNICAL FIELD

The present invention relates to connectors for attaching chemical supply lines to a vacuum tank in ultra-high vacuum systems.

BACKGROUND OF THE INVENTION

High vacuum systems are used in many scientific and manufacturing applications including particle accelerators and semiconductor device fabrication. In some semiconductor device fabrication processes, for example, caustic chemicals are selectively deposited onto a wafer at low pressures, and at temperatures typically in the range of 600° C. to 1000° C. In some processes, the deposition temperatures may exceed 1200° C. Thus, high vacuum systems must operate under severe chemical, pressure and temperature conditions.

Conventional high vacuum systems have a hard metal vacuum tank with a number of hard metal tubes extending from the tank. A hard metal flange, which is generally made from the same metal as the vacuum tank, is welded to the end of each tube. Because the entire system, including all of the tubes and flanges, is generally made from the same material, the joints between the tubes and flanges are very secure and do not deteriorate under the chemical, pressure, and thermal cycling conditions in which high vacuum systems operate. Each flange is connected to another hard metal flange of the same metal on a chemical supply line or a vacuum line to sealingly connect the lines to the vacuum tank. The flanges are connected together by positioning a metal gasket between knife edges or other raised features on the hard metal flanges, and drawing the hard metal flanges together to engage the knife edges or raised features with the soft metal gasket. The hard-metal to hard-metal flange connection is a proven system that provides a secure, durable seal in standard vacuum environments.

Although conventional high vacuum systems with hard metal vacuum tanks perform adequately, emerging high vacuum systems use soft metal vacuum tanks because they are generally lighter and less expensive to manufacture. The most common soft metal tanks are made from aluminum. One problem with soft metal tanks, however, is that it is difficult to connect the supply lines and vacuum lines to the tank because the joint between the soft metal tank and the hard metal flanges deteriorates under the severe pressure, temperature cycling, and chemical conditions used in semiconductor manufacturing and other ultra-high vacuum applications. For example, when the soft metal tank is composed of aluminum and the hard metal flanges are composed of stainless steel, the two metals tend to diffuse and react with each other when subjected to low pressure and either repeated temperature cycling or extended periods at high temperatures. This may create undesired alloys, compounds, metal byproducts and intermetallics at the interface between the different metals. After a period of time, therefore, ultra-high vacuum systems with soft metal tanks leak at the joints between the soft metal and hard metal components.

One existing connector system used on soft metal high vacuum tanks has a knife edge flange composed of the same metal as that of the tank and a titanium oxide film coating the knife edge of the soft metal flange. The titanium oxide coating forms a thin hard metal layer over the soft metal flange knife edge that can dig into a soft metal gasket. However, one problem with this connector is that the titanium oxide layer often cracks because most soft metals may anneal or even crack after repeated use at high temperatures used in typical high vacuum processes. Thus, soft metal flanges with a titanium oxide layer may leak after time in many high vacuum applications.

The new, ultra-high vacuum systems also create some difficulties. Previously, high vacuum systems operated in the $10^{-6}$ to $10^{-8}$ torr region. However, it is desirable in some systems to operate at much lower pressures. Attempts are now being made to operate many processes at ultra-high vacuums at $10^{-10}$ to $10^{-16}$ torr or lower.

In light of the problems associated with current techniques for sealing soft metal vacuum systems, their use in the ultra-high vacuum system is even more problematic.

SUMMARY OF THE INVENTION

The present invention is a connector for use in an ultra-high vacuum system that has a metal conduit section with a first hardness, a metal fitting member with a second hardness greater than the first hardness of the conduit section, and a metallic reaction-inhibiting barrier positioned between the conduit section and the fitting member to sealingly attach the fitting member to the conduit section. The metal conduit section has a first end, a second end, and a flow path between the first and second ends. The metal fitting member has a rear face proximate to the second end of the conduit section, and an opening between the front and rear faces aligned with the flow path of the conduit section. The reaction-inhibiting member is selected from a group of metals that will substantially inhibit metallic and chemical interaction between the conduit section and the fitting member under ultra-high vacuum, temperature cycling, and reactive chemical conditions. The reaction-inhibiting barrier accordingly substantially prevents deterioration of the joint between the metal conduit section and the metal fitting member to reduce leaks under ultra-high vacuum conditions.

DETAILED DESCRIPTION OF THE INVENTION

The present invention provides a connector and a connector system for use in ultra-high vacuum systems to connect a soft metal component to another metal component with a hard-metal to hard-metal connection. An important aspect of the invention is to bond a soft metal conduit section to a hard metal fitting member with a reaction-inhibiting barrier that is selected from a group of metals that substantially prevents metallic interaction between the soft metal conduit section and the hard metal fitting member. The reaction-inhibiting member accordingly maintains the chemical integrity of the soft metal conduit section and the hard metal fitting member by substantially preventing diffusion, breakdown, or the formation of intermetallics at the interface between the different types of metals. The soft metal conduit section is preferably attached to a component made from the same material, and the hard metal fitting member is preferably a hard metal flange adapted to be releasably connected to another hard metal flange. As a result, the connector of the present invention provides a hardmetal to hard-metal connection, and it prevents leaks at the joint between the soft metal conduit section and the hard metal fitting member. FIGS. 1–6, in which like reference numbers refer to like parts throughout the figures, illustrate connectors and connector systems in accordance with the invention.

An ultra-high vacuum system may operate in the range of $10^{-8}$ to $10^{-16}$ torr or lower. Depending on the environment, ultra-high vacuum systems may undergo repeated low temperature cycling from room temperature down to 2° K, repeated high temperature cycling from room temperature up to 1500° K, and repeated large range temperature cycling from 2° K to 1500° K. Prior art connectors are not capable of sustained operations in such systems because such temperature cycling at such low pressures causes the joints between components composed of aluminum and stainless steel to deteriorate and leak after a short time. The two metals have different thermal properties at high vacuum, and thus reactions between them may result in the formation of various metallic compounds, alloys or other materials which permit the joint to leak.

Figure 1:
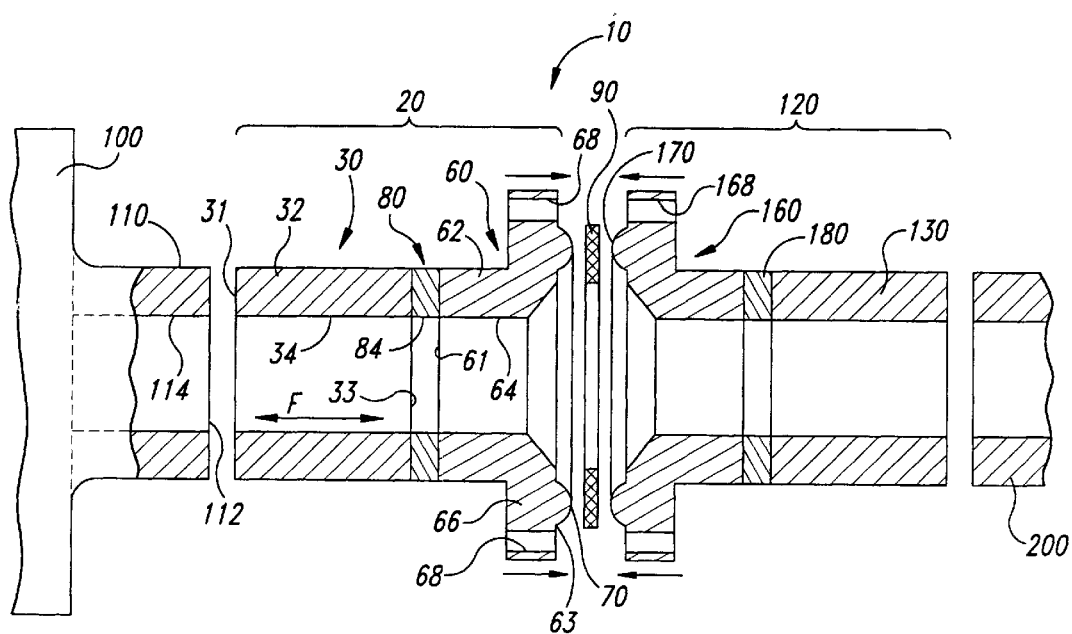
FIG. 1 is a partial cross-sectional view of a connector and connector system in accordance with the invention.

FIG. 1 illustrates a connector system 10 in accordance with the invention for releasably connecting a soft metal vacuum tank 100 to a fluid line 200. The connector system 10 has a first connector 20 adapted to be attached to the tank 100, and a second connector 120 adapted to be attached to the fluid line 200. The first and second connectors 20 and 120 preferably have the same general structure, but, as explained in detail below, the component parts of the connectors 20 and 120 may be made from different materials to accommodate the specific materials from which the tank 100 and fluid tube 200 are made.

The first connector 20 has a soft metal conduit section 30 with a tubular wall 32 that extends along a fluid flow path F between a first end 31 and a second end 33. The tubular wall 32 defines an elongated opening 34 through the conduit section along the flow path F. The first end 31 of the metal conduit section 30 is connected to a port 112 of a tube 110 on the vacuum tank 100. The tube 110 has an elongated opening 114 that extends into an internal cavity within the vacuum tank 100 and is aligned with the elongated opening 34 through the conduit section 30. The conduit section 30 is preferably connected to the port 112 by welding or braising the first end 31 of the conduit section 30 to the tube 110.

The conduit section 30 and the tube 110 are made of compatible metals that maintain a good seal at the joint between the conduit section 30 and the tube 110 under ultra-high vacuum and temperature cycling conditions. Accordingly, the conduit section 30 and the tube 110 are generally made from the same metal. If the tank 100 is aluminum or an aluminum alloy, suitable metals for the conduit section 30 include, but are not limited to, aluminum, titanium, zirconium, yttrium, molybdenum, manganese, copper and alloys thereof.

The first connector 20 also has a metal fitting member 60 with a second hardness greater than that of the first hardness of the conduit section 30. The metal fitting member 60 has a tubular wall 62 with a rear face 61 positioned proximate to the second end 33 of the conduit section 30, and a flange 66 with a front face 63 facing towards the line 200. The tubular wall 62 defines an opening 64 aligned with the elongated opening 34 of the conduit section 30. The flange 66 extends outwardly from the tubular wall 62, and a number of bolt holes 68 pass through the flange 66. The flange 66 also has a raised feature 70 oil its front face 63 that extends towards the second connector 120. The raised feature may be rounded (as shown) or a sharp knife edge (shown in FIG. 4). Suitable metals from which the metal fitting member 60 may be made include, but are not limited to, stainless steel, titanium, vanadium, nickel, cobalt, iron, chromium, zirconium, yttrium and alloys thereof. In a preferred embodiment, the metal fitting member 60 is made from a hard metal such as stainless steel.

Still referring to FIG. 1, a metallic reaction-inhibiting barrier 80 is positioned between the second end 33 of the conduit section 30 and the rear face 61 of the fitting member 60. The reaction-inhibiting barrier 80 sealingly attaches the conduit section 30 to the fitting member 60 to substantially prevent the joint between the conduit section 30 and the fitting member 60 from deteriorating under severe pressure, temperature cycling, and chemical conditions. The reaction-inhibiting barrier 80 preferably has an aperture 84 aligned with both the elongated opening 34 of the conduit section 30 and the opening 64 of the fitting member 60 to allow the flow path F to extend throughout the length of the connector 20.

The reaction-inhibiting barrier 80 is selected from a group of metals that substantially prevents metallic or chemical interaction between the soft metal conduit section 30 and the hard metal fitting member 60. The reaction-inhibiting barrier 80 may be made from a single metal, or preferably from multiple metals that are bonded together into a layered metal stack. The reaction-inhibiting barrier 80 accordingly reduces the deterioration at the interface between the soft metal conduit 30 and the hard metal fitting member 60 that typically occurs with semiconductor processing chemicals under ultra-high vacuum conditions and extreme temperatures. Therefore, the connector 20 of the present invention does not leak at the bond between the soft metal conduit section 30 and the metal fitting member 60.

In one embodiment of the invention, the metal conduit section 30 is made of aluminum, the metal fitting member 60 is made of stainless steel, and the reaction-inhibiting barrier 80 has a layer of niobium bonded to a layer of low-temper aluminum, such as T-0 6061 aluminum. The niobium layer is bonded to the stainless steel fitting member 60 and the low-temper aluminum is bonded to the aluminum conduit section 30. The niobium and low-temper aluminum layers substantially prevent metallic or chemical interaction between the aluminum conduit section 30 and the fitting member 60 to maintain the integrity of the joint between the conduit section 30 and the fitting member 60 under ultra-high vacuum and temperature cycling conditions.

In another embodiment of the invention, the metal conduit section 30 is made from aluminum, the metal fitting member 60 is made from stainless steel, and the reaction-inhibiting barrier 80 is made from a layer of titanium bonded to a layer of copper. The titanium layer is bonded to the aluminum conduit section 30, and the copper layer is bonded to the stainless steel fitting member 60. As with the niobium/low-temper aluminum reaction inhibiting barrier, the titanium/copper reaction-inhibiting substantially prevents metallic or chemical interaction between the conduit section 30 and the fitting member 60. One advantage of the titanium/copper reaction-inhibiting barrier is that it is relatively inexpensive.

In still another embodiment of the invention, the metal conduit section 30 is made from aluminum, the fitting member 60 is made from stainless steel, and the reaction-inhibiting barrier 80 is made from tantalum. The tantalum reaction-inhibiting barrier 80 is accordingly affixed to both the aluminum conduit section 30 and the stainless steel fitting member 60. This embodiment of the invention is particularly useful in chemical vapor deposition processes that use caustic chemicals because tantalum is less reactive than niobium or titanium, In the connector system 10 shown in FIG. 1, the first connector 20 is releasably coupled to the second connector 120. The second connector 120 has a conduit section 130 adapted to be connected to the fluid line 200, a hard metal fitting member 160 juxtaposed to the metal fitting member 60 of the first connector 20, and a reaction-inhibiting barrier 180 sealingly connecting the conduit section 130 to the fitting member 160. The conduct section 130 is preferably made from the same metal as that of the fluid line 200 so that the conduit section 130 may be welded or brazed to the fluid line 200 to form a durable joint between the conduit section 130 and the fluid line 200. The fitting member 160 is preferably made from a hard metal, and preferably has a raised feature 170 that mirrors the raised feature 70 of the fitting member 60. Thus, depending upon the materials from which the vacuum tank 100 and the fluid line 200 are made, the first and second connectors 120 may be made from the same materials.

The first and second connectors 20 and 120 are releasably attachable to one another so that the tank 100 may be disconnected from the line 200. To attach the connectors 20 and 120 together, the metal fitting members 60 and 160 are drawn together by a number of bolts (not shown) positioned in the bolt holes 68 and 168. As the fitting members 60 and 160 are drawn together, the raised features 70 and 170 engage a soft metal gasket 90 between the fitting members 60 and 160 to create a sealed connection between the first and second connectors 20 and 120. The seal against the soft metal gasket 90 prevents leaks at the interface between the first and second connectors 20 and 120 under severe chemical, pressure and temperature cycling conditions. To release the first connector 20 from the second connector 120, the bolts are merely disengaged from the connectors.

One advantage of the present invention is that the connector does not leak at the joint between the soft metal conduit section 30 and the hard metal fitting member 60. By providing a reaction-inhibiting barrier that substantially prevents metallic or chemical interaction between the conduit section and the fitting member 60, the joint between the conduit section 30 and the fitting member 60 does not deteriorate under the chemical, ultra-high vacuum, and temperature cycling conditions typically associated with semiconductor manufacturing and other ultra-high vacuum applications. The present invention, therefore, provides a durable, highly effective transition connector between different metals that is releasably attachable to another connector.

Another advantage of the present invention is that it provides a hard-metal to hard-metal connection between a soft metal component and a component made form another metal. Unlike conventional connectors used with soft metal components, the present invention uses a hard metal fitting member that can withstand large temperature extremes without cracking. Therefore, the first and second connectors 20 and 120 provide the desirable hard-metal to hard-metal connections necessary for releasable connectors in ultra-high vacuum and temperature cycling conditions.

Figure 2:
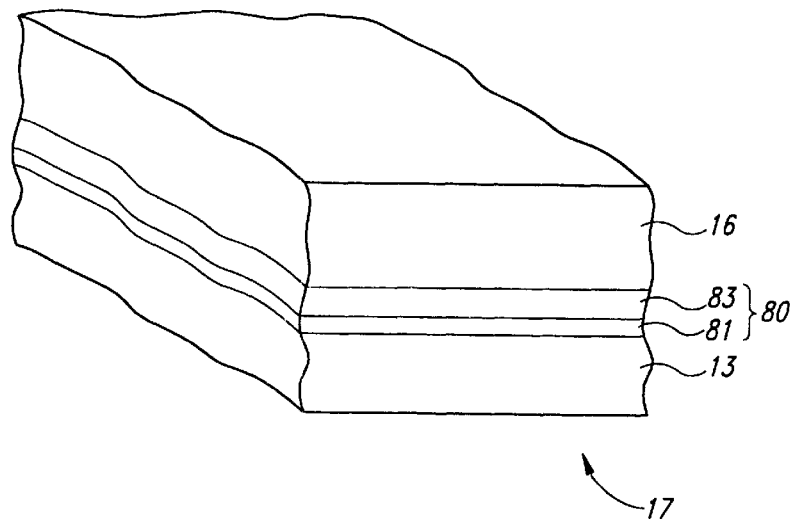
FIG. 2 is a partial isometric view of a bonded metal stack from which a connector in accordance with the invention is fabricated.

Referring to FIG. 2, the connectors 20 and 120 are preferably manufactured by forming a metal stack 17, and then machining the connectors from the metal stack 17. A first metal layer 13 composed of a first metal is explosion welded to one side of the reaction-inhibiting barrier 80. A second metal layer 16 composed of a second metal is then explosion welded to the other side of the reaction-inhibiting barrier 80. The explosion welding of the metal layers is performed in accordance with known explosion welding techniques. After the metal stack 17 is formed, the conduit section 30 is machined from the first metal layer 13, and the fitting member 60 is machined from the second metal layer 16.

In a specific embodiment of the invention, a connector with a hightemper aluminum conduit section 30 and a stainless steel fitting member 60 is made by: (1) explosion welding a first metal layer 13 of high-temper aluminum to a thin layer 81 of low-temper aluminum; (2) explosion welding a thin layer of niobium 83 to the layer of low-temper aluminum; and (3) explosion welding a second metal layer 16 of stainless steel to the exposed side of the niobium layer 83. The resulting metal stack 17 has a reaction-inhibiting barrier 80 with a low-temper aluminum layer 81 and a niobium layer 83. A connector having the desired shape is then formed by machining the metal stack 17. Thus, a connector formed from the metal stack 17 has a conduit section 30 formed from the first metal layer 13 of high-temper aluminum, a reaction-inhibiting barrier formed from the low-temper aluminum and niobium layers 81 and 83, and a fitting member 60 formed from the second metal layer 16 of stainless steel. In a preferred embodiment, the high-temper aluminum is T-6 6061 Al and the low-temper aluminum is T-0 6061 Al. The metal stack 17 is usually made from very large metal sheets so that dozens of different connects of various shapes and sizes can be formed from a single laminated metal stack.

Figure 3:
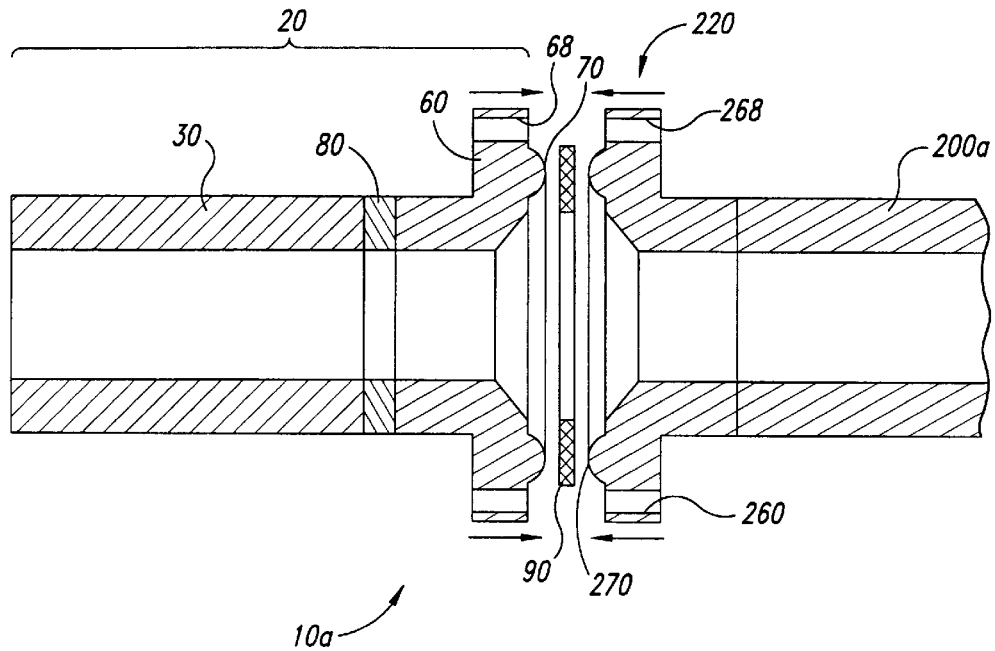
FIG. 3 is a partial cross-sectional view of another connector system in accordance with the invention.

FIG. 3 illustrates another connection system 10(a) of the invention in which the connector 20 is coupled to a hard metal connector 220 that is itself welded directly to a hard metal supply line 200(a). The connector 220 has a flange 266 with a raised feature 270 and a number of bolt holes 268. A number of bolts (not shown) in the bolt holes 68 and 268 draw the metal fitting members 60 and 260 into engagement with a soft metal gasket 90, until the raised features 70 and 270 of the metal fitting members 60 and 260 seal against the soft metal gasket 90. Therefore, the present invention also provides a hard-metal to hard-metal connection when only one component of the ultra-high vacuum system is made from a soft metal.

Figure 4:
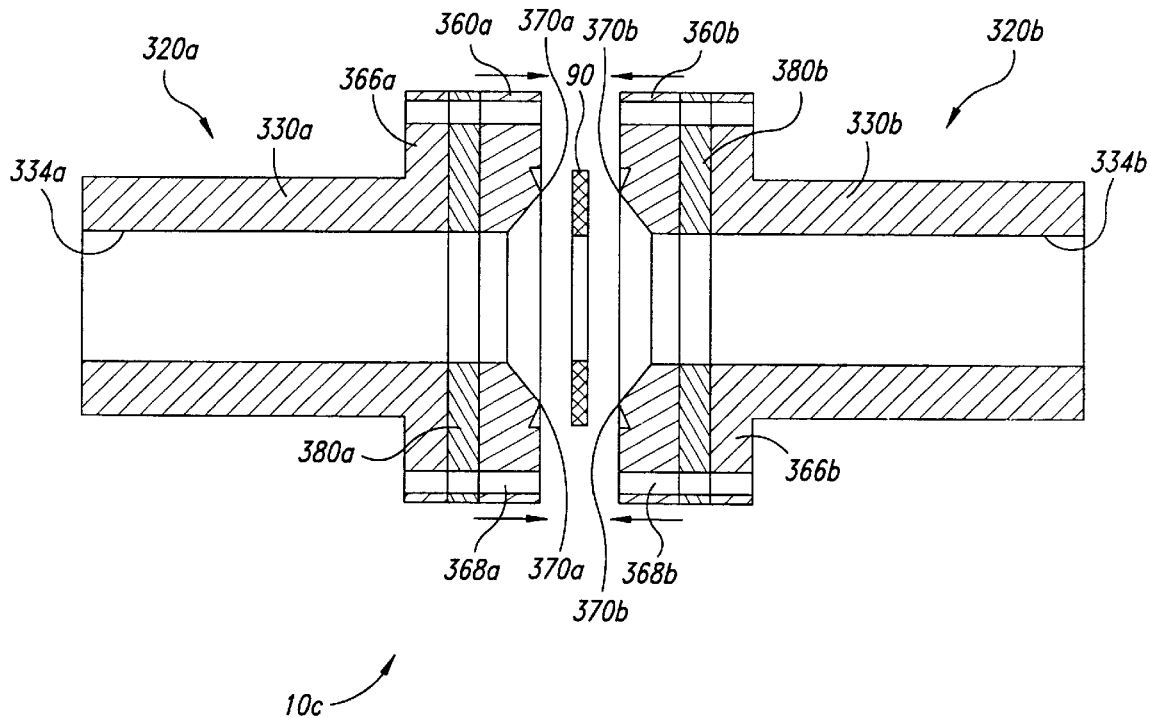
FIG. 4 is a partial cross-sectional view of another connector system in accordance with the invention.

FIG. 4 illustrates still another connector system 10(c) of the invention in which a hard metal knife edge connector 320(a) is connected to another hard metal knife edge connector 320(b). For purposes of brevity, only the features of the connector 320(a) will be discussed with the understanding that the components of the second connector 320(b) may be substantially similar. The first connector 320(a) has a conduit section 330(a), a fitting member 360(a) positioned proximate to the conduit section 330(a), and a reaction-inhibiting barrier 380(a) positioned between the conduit section 330(a) and the fitting ember 360(a). The reaction-inhibiting barrier 380(a) sealingly attaches the conduit section 330(a) to the fitting member 360(a) to substantially prevent the joint between the conduit section 330(a) and the fitting member 360(a) from deteriorating under the severe pressure, temperature cycling, and chemical conditions discussed above. The connector 320(a) has a flange 366(a) formed from a portion of the conduit 330(a), the reaction-inhibiting barrier 380(a), and the fitting member 360(a). A number of bolt holes 368(a) extend through the flange 366(*a*), and a raised feature that defines a knife edge 370(*a*) extends from a depression around an elongated opening 334(*a*) through the connector 320(*a*). The conduit section 330(*a*), the fitting member 360(*a*), and the reaction-inhibiting barrier 380(*a*) may be composed of the same materials as discussed above with respect to the connectors 20 and 120 of FIGS. 1–3.

In operation, a number of bolts (not shown) in the bolt holes 368(*a*) and 368(*b*) draw the metal fitting members 360(*a*) and 360(*b*) into engagement with a soft metal gasket 90, until the knife edges 370(*a*) and 370(*b*) of the metal fitting members 360(*a*) and 360(*b*) seal against the soft metal gasket 90. In light of the position of the reaction-inhibiting barriers 380(*a*) and 380(*b*) shown in FIG. 4, it will be appreciated that the present invention may position the reaction-inhibiting barrier and the connector at any convenient location along the connector to provide an adequate cost effective seal between the conduit section and the hard metal fitting member.

Figure 5:
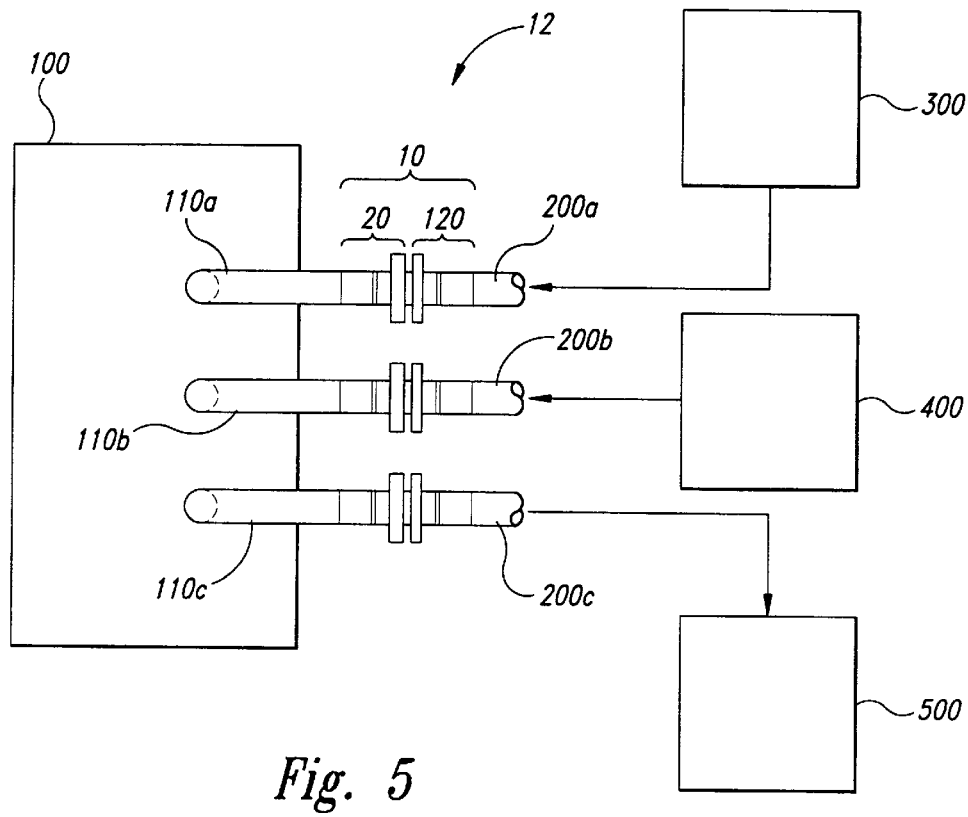
FIG. 5 is a schematic view of an ultra-high vacuum system in accordance with the invention.

FIG. 5 schematically illustrates an ultra-high vacuum system 12 in accordance with the invention. The ultra-high vacuum system 12 has a vacuum tank 100 with a number of tubes 110(*a*)–(*c*). A connector system 10 with first and second connectors 20 and 120 in accordance with the invention attaches each of the tubes 110(*a*)–(*c*) to supply lines 200(*a*)–(*c*), respectively. A first chemical supply 300 is connected to the supply line 200(*a*), a second chemical supply 400 is connected to the supply line 200(*b*), and a vacuum pump 500 is connected to the supply line 200(*c*).

In operation, the vacuum pump 500 draws down the pressure within the vacuum tank 100 to a desired level, which may be approximately $10^{-8}$ to $10^{-16}$ torr. The vacuum system 12 is also heated or cooled to a desired temperature between 2° K and 1400° K, and the temperatures may be repeatedly cycled several times between a first high temperature and a second low temperature. The appropriate chemicals from the first and second chemical supplies 300 and 400 are then selectively delivered into the vacuum tank 100 through the supply lines 200(*a*) and 200(*b*). As discussed above with respect to FIG. 1, the vacuum tank 100 is preferably a soft metal tank made from an aluminum or another suitable metal.

The vacuum system 12, and more specifically the connectors 120(*a*)–120(*c*), maintain an ultra-high vacuum after at least twenty temperature cycles and more preferably after over 200 temperature cycles. The standard for determining whether a reaction-inhibiting barrier has maintained the integrity of the joint between the conduit section and the fitting member in accordance with the invention is measured by the extent of leaking at the joint. Thus, a reaction inhibiting barrier of the invention that substantially inhibits metallic interaction between the conduit section and the fitting member may allow a measurable change in structure at the joint so long as the connector maintains an ultra-high vacuum after repeated temperature cycling.

Figure 6:
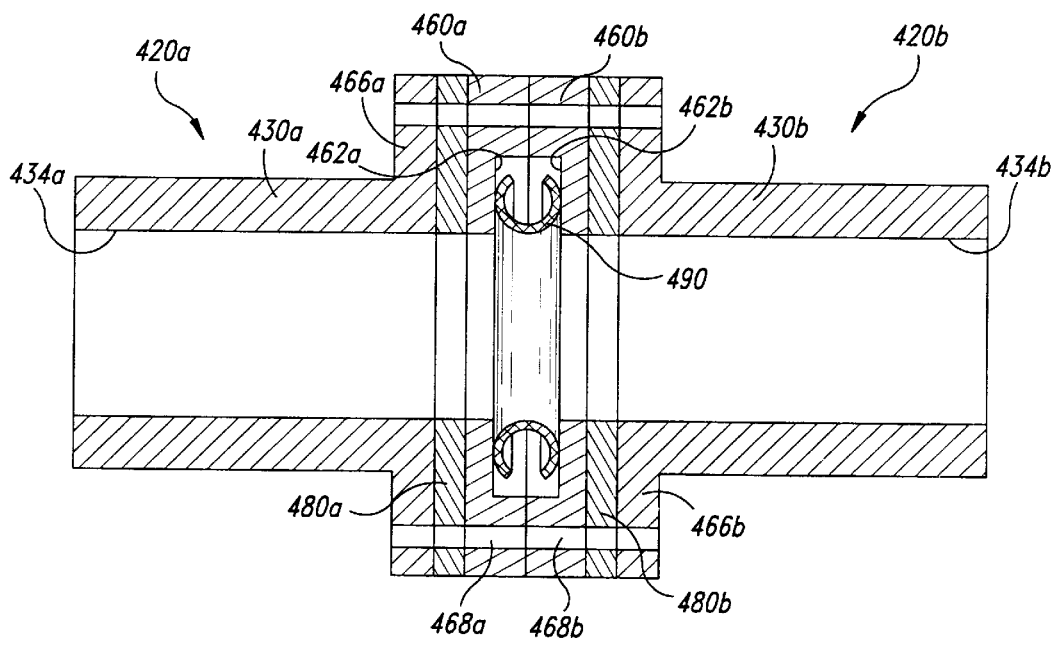
FIG. 6 is a partial cross-sectional view of another connector system in accordance with the invention.

FIG. 6 illustrates still another connector system in which a C-shaped spring seals a first connector 420(*a*) to a second connector 420(*b*). For purposes of brevity, only the features of the connector 420(*a*) will be discussed with the understanding that the components of the second connector 420(*b*) may be substantially similar. The first connector 420(*a*) has a conduit section 430(*a*), a fitting member 460(*a*) positioned proximate to the conduit section 430(*a*), and a reaction-inhibiting barrier 480(*a*) positioned between the conduit section 430(*a*) and the fitting member 460(*a*). The reaction-inhibiting barrier 480(*a*) sealingly attaches the conduit section 430(*a*) to the fitting member 460(*a*) to substantially prevent the joint between the conduit section 430(*a*) and the fitting member 460(*a*) from deteriorating under the severe pressure, temperature cycling, and chemical conditions discussed above. The first connector 420(*a*) has a flange 466(*a*) formed from a portion of the conduit section 430(*a*), the reaction-inhibiting barrier 480(*a*), and the fitting member 460(*a*). A number of bolt holes 468(*a*) extend through the flange 466(*a*), and the front face of the fitting member 460(*a*) has a large recess 462(*a*) in which a portion of a C-shaped spring seal is positioned. The conduit section 430(*a*), the fitting member 460(*a*), and the reaction-inhibiting barrier 480(*a*) are generally composed of the same materials as discussed above with respect to the connectors 20, 120, and 320 of FIGS. 1–4.

In operation, a number of bolts (not shown) positioned in the bolt holes 468(*a*) and 468(*b*) draw the metal fitting members 460(*a*) and 460(*b*) into engagement with the C-shaped spring 490. As the C-shaped spring 490 is compressed, the contact points between the C-shaped spring 490 and the recesses 462(*a*) and 462(*b*) create a seal between the first and second connectors 420(*a*) and 420(*b*).

From the foregoing it will be appreciated that, although specific embodiments of the invention have been described herein for purposes of illustration, various modifications may be made without deviating from the spirit and scope of the invention. For example, the metals from which the conduit sections, fitting members, and reaction-inhibiting barriers are made may be different from those disclosed above. The metals from which the conduit sections are made will generally depend upon the material of the component to which the conduit section is attached. Similarly, the fitting members may be made from any sufficiently hard metal to provide an adequate seal under the specific pressure and temperature conditions. The material from which the reaction-inhibiting barrier is made depends upon the materials of the conduit section and the fitting member; the primary criteria of the reaction inhibiting barrier is that it first substantially prevent the joint between the conduit section and fitting member from deteriorating under the specific vacuum, temperature cycling, and chemical conditions. Accordingly, the invention is not limited except as by the appended claims.

We claim:

1. A connector for use in an ultra-high vacuum system, comprising:

a metal conduit section comprised of aluminum having a first hardness and a first temper, the conduit section having a first end, a second end, and a flow path between the first and second ends;

a metal fitting member having, a second hardness greater than the first hardness of the conduit section, the fitting member having a rear face proximate to the second end of the conduit section and an opening aligned with the flow path of the conduit section; and a metallic reaction-inhibiting barrier positioned between the conduit section and the fitting member and sealingly attached to the fitting member and the conduit section, the reaction-inhibiting barrier having an aperture aligned with the flow path of the conduit section and the opening of the fitting member, the reaction-inhibiting barrier being comprised of a layer of niobium and layer of aluminum having a second temper bonded to the layer of niobium, the second temper of the layer of aluminum being less than the first temper of the aluminum conduit section, and the niobium/aluminum reaction-inhibiting, barrier inhibiting metallic interaction between the conduit section and the fitting member under ultra-high vacuum and temperature cycling conditions.

2. The connector of claim 1 wherein the reaction-inhibiting barrier comprises a layer of niobium and the aluminum layer of the reaction-inhibiting barrier comprises a layer of T-0 aluminum affixed to the niobium layer, the niobium layer being affixed to the metal fitting member and the T-0 aluminum layer being affixed to the metal conduit section.

3. The connector of claim 2 wherein the conduit section comprises T-6 aluminum and the fitting member comprises stainless steel, and wherein the stainless steel fitting member, the niobium layer, the T-0 aluminum layer, and the T-6 aluminum conduit section being affixed together, respectively, by explosion welds.

4. The connector of claim 1 wherein the metal fitting has a front face facing away from the rear face, and a raised feature defining a knife edge extending from the front face.

5. The connector of claim 1 wherein the metal fitting member has a flange extending radially outwardly from the opening transverse to the flow path, the flange having a front face facing away from the rear face.

6. The connector of claim 5 wherein the front face has a raised feature defining a knife edge extending from the front face.

7. A connector for use in an ultra-high vacuum system, comprising:
a metal conduit section comprised of aluminum having a first hardness and a first temper, the conduit section having a first end, a second end, and a flow path between the first and second ends;
a metal fitting member comprised of stainless steel having a second hardness greater than the first hardness of the conduit section, the fitting member having a rear face proximate to the second end of the conduit section and an opening aligned with the flow path of the conduit section; and
a metallic reaction-inhibiting barrier positioned between the conduit section and the fitting member and sealingly attached to the fitting member and the conduit section, the reaction-inhibiting barrier having an aperture aligned with the flow path of the conduit section and the opening of the fitting member, the reaction-inhibiting barrier being comprised of a layer of titanium and a layer of copper bonded to the titanium, the titanium layer being affixed to the aluminum conduit section and the copper layer being affixed to the stainless steel fitting member, and the titanium/copper reaction-inhibiting barrier inhibiting reaction between the aluminum conduit section, the copper layer, the titanium layer, and the stainless steel fitting member.

8. A connector system for ultra-high vacuum processing equipment, comprising:
a first connector having a first metal conduit section composed of aluminum, a first metal fitting member composed of stainless steel proximate to the first conduit section, and a reaction-inhibiting barrier between the first conduit section and the first fitting member and sealingly attached to the first fitting member and the first conduit section, the first conduit section having a first hardness and the first metal fitting member having a second hardness greater than the first hardness of the first conduit section, and the first reaction-inhibiting barrier comprising a layer of niobium bonded to a layer of T-0 aluminum, the niobium layer being affixed to the stainless steel fitting member and the T-0 aluminum layer being affixed to the aluminum conduit section, wherein the niobium/aluminum reaction-inhibiting barrier substantially prevents metallic interaction between the first metal conduit section and the first metal fitting member under ultra-high vacuum and temperature cycling conditions.

9. An ultra-high vacuum system, comprising:
a vacuum tank having a body defining a chamber and a tube extending from the body, the body and the tube being made of aluminum having a first hardness;
a first conduit section made of T-6 aluminum, the first conduit section having a first end affixed to the tube, a second end, a flow path between the first and second ends in fluid communication with the chamber of the tank;
a first metal fitting member made of stainless steel having a second hardness greater than the first hardness of the first metal, the first fitting member having a rear face proximate to the second end of the conduit section, a front face facing away from the rear face, and an opening between the front and rear faces aligned with the flow path of the conduit section;
a first metallic reaction-inhibiting barrier positioned between the second end of the first conduit section and the rear face of the first fitting member and sealingly attached to the first conduit section and the first fitting member, the first reaction-inhibiting barrier having an aperture aligned with the flow path of the first conduit section and the opening of the first fitting member, and the first reaction-inhibiting barrier being composed of a niobium layer bonded to a T-0 aluminum layer, the niobium layer being affixed to the stainless steel first fitting member and the T-0 aluminum layer being affixed to the T-6 aluminum first conduit section to substantially inhibit metallic interaction between the first conduit section and the first fitting member under ultra-high vacuum conditions and temperature cycling;
a second metal fitting member sealingly coupled to the first metal fitting member, the second metal fitting member being made of a metal having a hardness adequate to form a seal with the first metal fitting member; and
a chemical supply operatively connected to the second fitting, wherein chemicals are delivered from the chemical supply to the chamber through the second fitting, the first fitting, and the first conduit section.

10. The vacuum system of claim 9, further comprising:
a second metal conduit section connected to a fluid line from the chemical supply; and
a second metallic reaction-inhibiting barrier positioned between the second metal conduit section and the second metal fitting member to sealingly attach the second fitting member to the second conduit section, the second metallic reaction-inhibiting barrier being selected from a group of metals that will substantially prevent metallic interaction between the second metal conduit section and the second metal fitting member under ultra-high vacuum and temperature cycling conditions.

11. The vacuum system of claim 10 wherein:
the body of the tank is made from aluminum;
the second metal conduit section is made from T-6 aluminum;
the second metal fitting member is made from stainless steel; and the second reaction-inhibiting barrier is made from a second niobium layer bonded to a second T-0 aluminum layer, the second niobium layer being affixed to the stainless steel second metal fitting member and the second T-0 aluminum layer being affixed to the T-6 aluminum second conduit section.

* * * * *